(12) United States Patent  
Scott

(10) Patent No.: US 8,466,878 B2  
(45) Date of Patent: *Jun. 18, 2013

(54) HANDHELD ELECTRONIC DEVICE INCLUDING AUTOMATIC PREFERRED SELECTION OF A PUNCTUATION, AND ASSOCIATED METHOD

(75) Inventor: Sherryl Lee Lorraine Scott, Waterloo (CA)

(73) Assignee: Research In Motion Limited, Waterloo, Ontario (CA)

(*) Notice: Subject to any disclaimer, the term of this patent is extended or adjusted under 35 U.S.C. 154(b) by 541 days.

This patent is subject to a terminal disclaimer.

(21) Appl. No.: 12/696,393

(22) Filed: Jan. 29, 2010

(65) Prior Publication Data

US 2010/0131266 A1    May 27, 2010

Related U.S. Application Data

(63) Continuation of application No. 11/388,743, filed on Mar. 24, 2006, now Pat. No. 7,679,606.

(51) Int. Cl.  
*G09G 5/00* (2006.01)

(52) U.S. Cl.  
USPC ............................................. 345/171; 341/22

(58) Field of Classification Search  
USPC ..... 345/156–173; 178/18.03–18.07; 715/811, 715/864, 865, 866; 341/22–28; 710/67  
See application file for complete search history.

(56) References Cited

U.S. PATENT DOCUMENTS

| | | | |
|---|---|---|---|
| 6,307,548 B1* | 10/2001 | Flinchem et al. | 715/811 |
| 6,307,549 B1* | 10/2001 | King et al. | 715/810 |
| 6,378,234 B1* | 4/2002 | Luo | 341/22 |
| 7,679,606 B2* | 3/2010 | Scott | 345/168 |
| 2004/0056844 A1* | 3/2004 | Gutowitz et al. | 345/168 |
| 2006/0005129 A1* | 1/2006 | Wen et al. | 715/536 |
| 2007/0188472 A1* | 8/2007 | Ghassabian | 345/169 |

* cited by examiner

*Primary Examiner* — Tom Sheng  
(74) *Attorney, Agent, or Firm* — Finnegan, Henderson, Farabow, Garrett & Dunner, LLP

(57) ABSTRACT

A method of enabling input on a handheld electronic device, which includes an input apparatus having a number of input members that are capable of being actuated, wherein at least one of the input members has a plurality of selectable output alternatives, includes detecting as a first input an actuation of an input member, generating a first output, detecting as a second input an actuation of an input member having a plurality of selectable output alternatives comprising at least a primary punctuation and a secondary punctuation, determining that said first output has a predetermined characteristic, preferring as a second output said secondary punctuation, and outputting said second output.

23 Claims, 3 Drawing Sheets

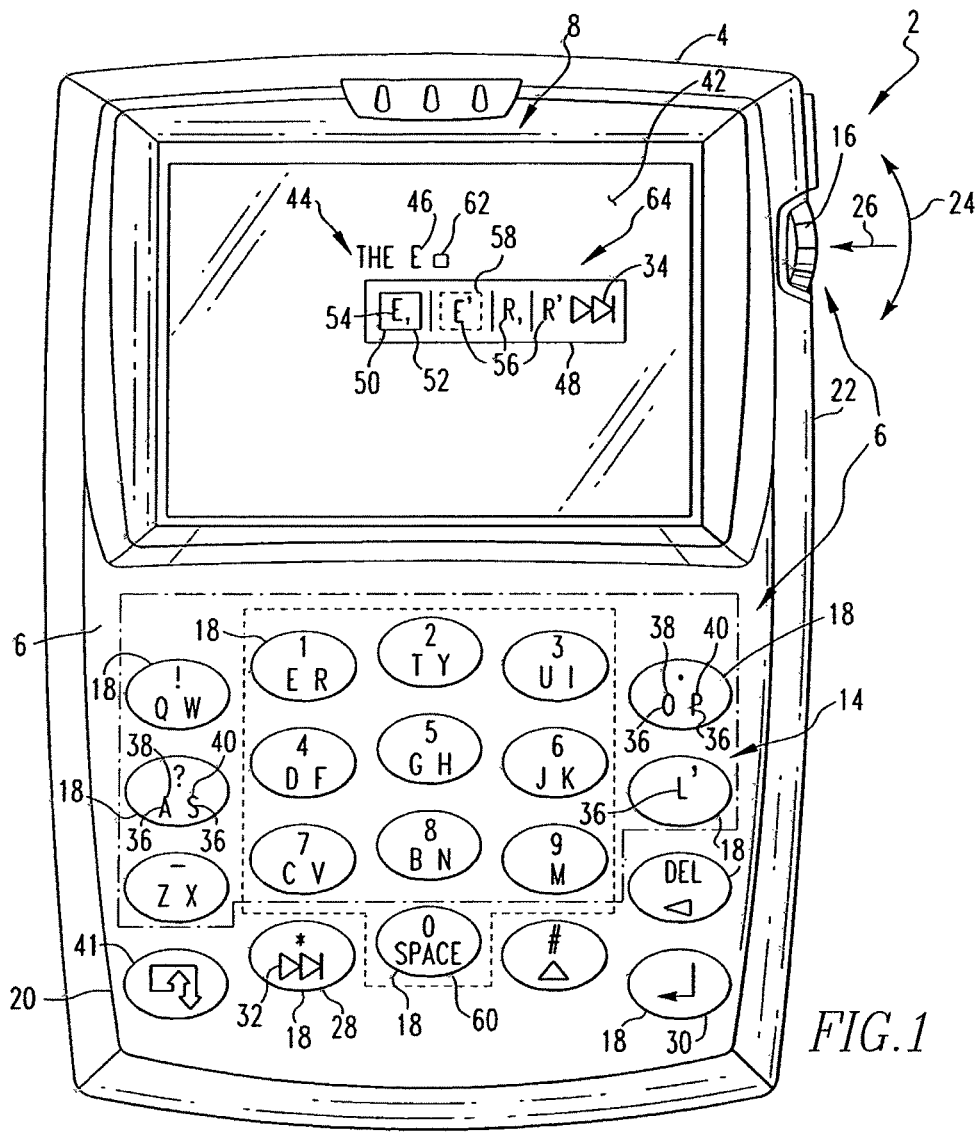
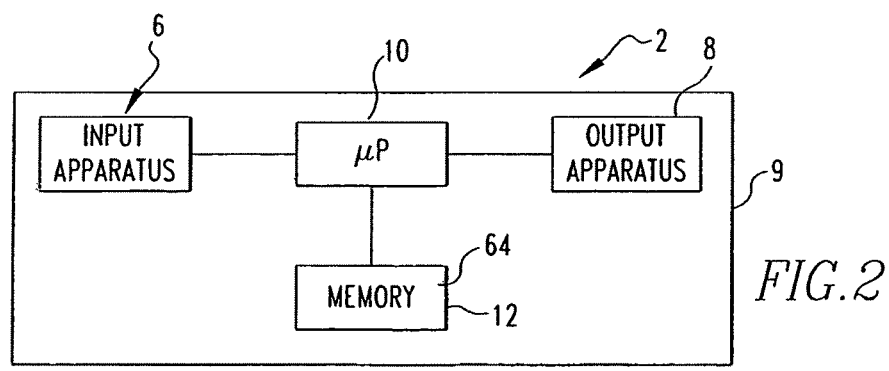
FIG.1
FIG.2

HANDHELD ELECTRONIC DEVICE INCLUDING AUTOMATIC PREFERRED SELECTION OF A PUNCTUATION, AND ASSOCIATED METHOD

CROSS-REFERENCE TO RELATED APPLICATIONS

The instant application is a continuation of U.S. patent application Ser. No. 11/388,743 filed on Mar. 24, 2006 now U.S. Pat. No. 7,679,606, entitled "Handheld Electronic Device Including Automatic Preferred Selection of a Punctuation, and Associated Method," the contents of which are incorporated herein.

BACKGROUND

1. Field

The disclosed and claimed concept relates generally to handheld electronic devices and, more particularly, to a method of enabling input on a handheld electronic device.

2. Description of the Related Art

Numerous types of handheld electronic devices are known. Examples of such handheld electronic devices include, for instance, personal data assistants (PDAs), handheld computers, two-way pagers, cellular telephones, and the like. Many handheld electronic devices also feature wireless communication capability, although many such handheld electronic devices are stand-alone devices that are functional without communication with other devices.

Such handheld electronic devices are generally intended to be portable, and thus are of a relatively compact configuration in which keys and other input structures often perform multiple functions under certain circumstances or may otherwise have multiple aspects or features assigned thereto. With advances in technology, handheld electronic devices are built to have progressively smaller form factors yet have progressively greater numbers of applications and features resident thereon. As a practical matter, the keys of a keypad can only be reduced to a certain small size before the keys become relatively unusable. In order to enable text entry, however, a keypad must be capable of entering all twenty-six letters of the Latin alphabet, for instance, as well as appropriate punctuation and other symbols.

One way of providing numerous letters in a small space has been to provide a "reduced keyboard" in which multiple letters, symbols, and/or digits, and the like, are assigned to any given key. For example, a touch-tone telephone includes a reduced keypad by providing twelve keys, of which ten have digits thereon, and of these ten keys eight have Latin letters assigned thereto. For instance, one of the keys includes the digit "2" as well as the letters "A", "B", and "C". Other known reduced keyboards have included other arrangements of keys, letters, symbols, digits, and the like.

In order to enable a user to make use of the multiple letters, digits, and the like on any given key, numerous keystroke interpretation systems have been provided. For instance, a "multi-tap" system allows a user to substantially unambiguously specify a particular character on a key by pressing the same key a number of times equivalent to the position of the desired character on the key. For example, on the aforementioned telephone key that includes the letters "ABC", and the user desires to specify the letter "C", the user will press the key three times. While such multi-tap systems have been generally effective for their intended purposes, they nevertheless can require a relatively large number of key inputs compared with the number of characters that ultimately are output.

Another exemplary keystroke interpretation system would include key chording, of which various types exist. For instance, a particular character can be entered by pressing two keys in succession or by pressing and holding first key while pressing a second key. Still another exemplary keystroke interpretation system would be a "press-and-hold/press-and-release" interpretation function in which a given key provides a first result if the key is pressed and immediately released, and provides a second result if the key is pressed and held for a short period of time. While such systems have likewise been generally effective for their intended purposes, such systems also have their own unique drawbacks.

Another keystroke interpretation system that has been employed is a software-based text disambiguation function. In such a system, a user typically presses keys to which one or more characters have been assigned, actuating each key one time for each desired letter, and the disambiguation software attempts to predict the intended input. Numerous such systems have been proposed, and while many have been generally effective for their intended purposes, shortcomings still exist.

One such shortcoming arises when the handheld electronic device has a "keyboard" in which multiple punctuations are assigned to a given key. For example, the comma (,) as well as the apostrophe (') might be assigned to a single key. When such a key is depressed, the handheld electronic device will typically prefer the comma as the user's first input selection as opposed to the apostrophe. There are instances, however, when a user would prefer having the apostrophe appear as the first selection rather than the comma.

It would be desirable, therefore, to provide an improved method of enabling input on a handheld electronic device in which the handheld electronic device has the capability of presenting to a user a punctuation most likely to be assigned by the user.

BRIEF DESCRIPTION OF THE DRAWINGS

A full understanding can be gained from the following Description when read in conjunction with the accompanying drawings in which:

FIG. 1 is a top plan view of an improved handheld electronic device in accordance with the disclosed and claimed concept;

FIG. 2 is a schematic depiction of the improved handheld electronic device of FIG. 1;

DESCRIPTION

Figure 3:
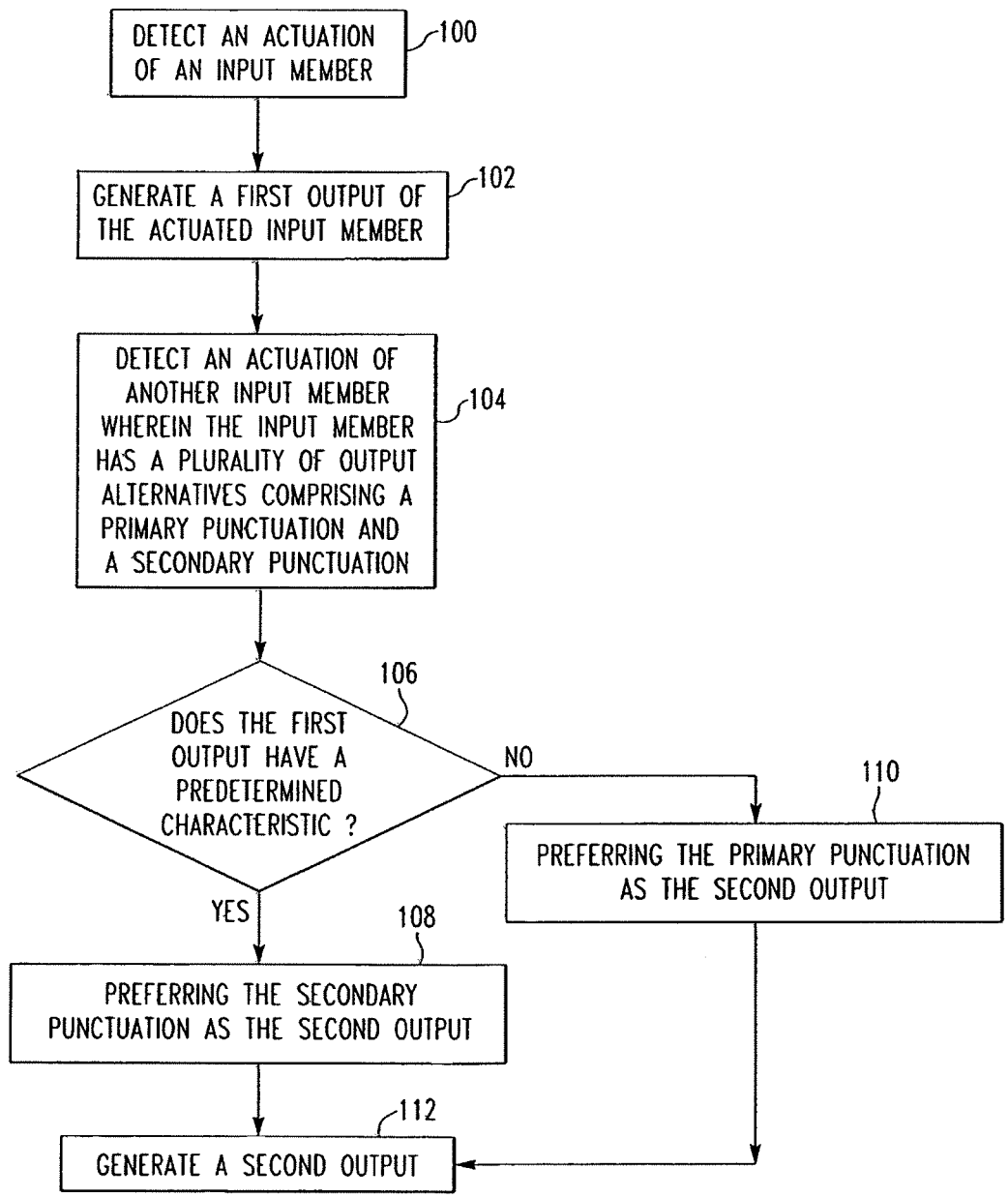
FIG. 3 is a flowchart depicting one embodiment of a method in accordance with the disclosed and claimed concept.

The accompanying figures and the description that follows set forth the disclosed and claimed concept in its preferred embodiments. It is, however, contemplated that persons generally familiar with handheld electronic devices will be able to apply the novel characteristics of the methods illustrated and described herein in other contexts by modification of certain details. Accordingly, the figures and description are not to be taken as restrictive on the scope of the disclosed and claimed concept, but are to be understood as broad and general teachings.

When referring to the term "linguistic element" and variations thereof, such designations shall refer broadly to any element that itself can be a language object or from which a language object can be constructed, identified, or otherwise obtained, and thus would include, but not be limited to, characters, letters, strokes, symbols, ideograms, phonemes, morphemes, digits (numbers), and the like.

When referring to the term "consonant" and variations thereof, such designation is meant to cover all letters of the Latin alphabet that are regarded as consonants regardless of whether the letter is uppercase (Majuscule form) or lowercase (Minuscule form).

When referring to the term "number" and variations thereof, such designation is meant to cover use of any numbers or digits including, but not limited, to the natural numbers as well as negative and non-negative numbers.

When referring to the term "punctuation" and variations thereof, such designation is meant to cover use of the following: the exclamation point (!), the question mark (?), the period (.), the comma (,), the apostrophe ('), the open quotation mark ("), the closed quotation mark ("), the semicolon (;), and/or the colon (:).

When referring to the term "reduced" and variations thereof in the context of a keyboard, a keypad, or other arrangement of input members, such designations shall refer broadly to an arrangement in which at least one of the input members has assigned thereto a plurality of linguistic elements such as, for example, characters in the set of Latin letters.

For purposes of the description hereinafter, the terms "upper", "lower", "right", "left", "vertical", "horizontal", "top", "bottom", and derivatives thereof shall relate to the disclosed and claimed concept as it is oriented in the figures.

An improved handheld electronic device 2 is indicated generally in FIG. 1 and is depicted schematically in FIG. 2. The exemplary handheld electronic device 2 includes a housing 4 upon which are disposed a processor unit that includes an input apparatus 6, an output apparatus 8, a processor 10, a memory 12, and at least a first routine. The processor 10 may be, for instance, and without limitation, a microprocessor (μP) and is responsive to inputs from the input apparatus 6 and provides output signals to the output apparatus 8. The processor 10 also interfaces with the memory 12. The processor 10 and the memory 12 together form a processor apparatus. Examples of handheld electronic devices are included in U.S. Pat. Nos. 6,452,588 and 6,489,950, which are incorporated by reference herein.

As can be understood from FIG. 1, the input apparatus 6 includes a keypad 14 and a thumbwheel 16. As will be described in greater detail below, the keypad 14 is in the exemplary form of a reduced QWERTY keyboard including a plurality of keys 18 that serve as input members. It is noted, however, that the keypad 14 may be of other configurations, such as an AZERTY keyboard, a QWERTY keyboard, or other keyboard arrangement, whether presently known or unknown, and either reduced or not reduced.

The system architecture of the handheld electronic device 2 advantageously is organized to be operable independent of the specific layout of the keypad 14. Accordingly, the system architecture of the handheld electronic device 2 can be employed in conjunction with virtually any keypad layout without requiring any meaningful change in the system architecture. It is further noted that certain of the features set forth herein are usable on either or both of a reduced keyboard and a non-reduced keyboard.

The keys 18 are located on a front face 20 of the housing 4, and the thumbwheel 16 is located at a side 22 of the housing 4. In addition to the keys 18, the thumbwheel 16 can serve as another input member since the thumbwheel 16 is capable of being rotated, as indicated by arrow 24, and depressed generally toward the housing 4, as indicated by arrow 26. Rotation of the thumbwheel 16 provides selection inputs to the processor 10, while depression of the thumbwheel 16 provides another selection input to the processor 10.

Among the keys 18 of the keypad 14 are a <NEXT> key 28 and an <ENTER> key 30. The <NEXT> key 28 can be depressed to provide a selection input to the processor 10 and provides substantially the same selection input as is provided by a rotational input of the thumbwheel 16. Since the <NEXT> key 28 is provided adjacent a number of the other keys 18 of the keypad 14, the user can provide a selection input to the processor 10 substantially without moving the user's hands away from the keypad 14 during a text entry operation. The <NEXT> key 28 additionally and advantageously includes a graphic 32 disposed thereon, and in certain circumstances the output apparatus 8 also displays a displayed graphic 34 thereon to identify the <NEXT> key 28 as being able to provide a selection input to the processor 10. In this regard, the displayed graphic 34 of the output apparatus 8 is substantially similar to the graphic 32 on the <NEXT> key 28 and thus identifies the <NEXT> key 28 as being capable of providing a desirable selection input to the processor 10.

As can further be seen in FIG. 1, many of the keys 18 include a one or more linguistic elements (characters) 36 disposed thereon. In the exemplary depiction of the keypad 14, many of the keys 18 include two linguistic elements, such as including a first linguistic element 38 and a second linguistic element 40 assigned thereto. Accordingly, when a key 18 having a first and a second linguistic element 38, 40 is depressed or actuated the input of that particular key can either be the first or second linguistic element 38, 40.

To illustrate, one of the keys 18 of the keypad 14 includes as the linguistic elements 36 thereof the letters "Q" and "W" while an adjacent key 18 includes as the characters 36 thereof the letters "E" and "R". If the key 18 on which the "Q" and "W" are disposed is actuated, then the output of the key 18 can either be the letter "Q" or the letter "W". It can also be seen that the arrangement of the characters 36 on the keys 18 of the keypad 19 in FIG. 1 is generally of a QWERTY arrangement, albeit with many of the keys 18 including two of the characters 36.

Furthermore, punctuations may also be assigned to one or more keys 18 on the keypad 14. For example, the key 18 on which the letters "Q" and "W" are disposed also includes the exclamation point (!). In the particular embodiment of the keypad 18 that is depicted in FIG. 1, all of the punctuations are entered into the handheld electronic device 2 by actuating the <SHIFT> key 41 immediately prior to actuating the key 18 on which the desired punctuation is disposed. It should also be noted, however, that in other embodiments of the keypad 18 the actuation of the <SHIFT> key 41 prior to depressing the punctuation key might not be necessary.

Moreover, two or more punctuations may be assigned to a single key 18 despite the fact that these punctuations are represented only by a single character disposed on the key 18. For instance, referring to FIG. 1, one of the keys 18 of the keypad 14 includes as the characters 36 thereof the letter "L" and a graphic that represents the comma and the apostrophe.

The output apparatus 8 includes a display 42 upon which can be provided an output 44. An exemplary output 44 is depicted on the display 42 in FIG. 1. The output 44 includes a text component 46 and a variant component 48. As can be seen from FIG. 1, the variant component 48 extends substantially horizontally across the display 42. This, however, is not meant to be limiting since the variant component 48 can also extend across the display 42 substantially vertically. Preferably, the variant component 48 is located generally in the vicinity of the text component 46. The variant component 48 includes a predetermined quantity of output from which the user can select. The variant component 48 includes a selection box 50 that appears in a default position 52. Initially, the default position 52 of the selection box 50 surrounds and/or highlights a preferred output 54 while the remainder of the variant component 48 displays various alternative outputs 56. As described in commonly owned U.S. patent application Ser. No. 10/931,281 entitled "Handheld Electronic device with Text Disambiguation," the preferred output 54 is proposed by the text disambiguation function as being the most likely disambiguated interpretation of the ambiguous input provided by the user. The selection box 50 is capable of moving (i.e. shifting) from the default position 52 to a number of other positions 58 by depressing or actuating the <NEXT> key 28 or by rotating the thumbwheel 16. By moving the selection box 50 to surround and/or highlight the various alternative output choices 56, the user is able to select any one of the various alternative outputs 56 for possible output on the handheld electronic device's 2 output apparatus 8. The display 42 also includes a caret (cursor) 62 that depicts generally where the next output will be displayed.

To illustrate, if a user actuates a key 18 on which the letters "Q" and "W" are disposed, the handheld electronic device 2 will detect the actuation of the key 18 and display on the output apparatus 8 the variant component 48. In this particular example, the handheld electronic device 2 will display within the variant component 48 the letters "Q" and "W". Assuming that the handheld electronic device 2 prefers the letter "Q" as the preferred output 54, the selection box 50 will initially surround or highlight the letter "Q" while the letter "W", the alternative output 56, will be displayed outside of the selection box 50. The letter "Q", which is the preferred output 54, is automatically output at the caret's 62 original position. The user can then continue to input additional linguistic elements into the handheld electronic device 2 by actuating the input members on the handheld electronic device 2. Alternatively, if the user would like to select the letter "Q", the user would actuate the <ENTER> or <SPACE> keys 30, 60 or depress the thumbwheel 16.

If the user would rather select the letter "W" as opposed to the preferred letter "Q", then the user would move the selection box 50 to surround or highlight the letter "W" by either rotating the thumbwheel 16 or actuating the <NEXT> key 28. Once the letter "W" has been surrounded or highlighted by the selection box 50, the handheld electronic device 2 will automatically output the letter "W" at the caret's 62 original position.

The memory 12 is depicted schematically in FIG. 2. The memory 12 can be any of a variety of types of internal and/or external storage media such as, without limitation, RAM, ROM, EPROM(s), EEPROM(s), and the like that provide a storage register for data storage such as in the fashion of an internal storage area of a computer, and can be volatile memory or nonvolatile memory. As can be seen from FIG. 2, the memory 12 is in electronic communication with the processor 10. The memory 12 additionally includes a number of routines depicted generally with the numeral 64 for the processing of data. The routines 64 can be in any of a variety of forms such as, without limitation, software, firmware, and the like. As will be explained in greater detail below, the routines 64 include a routine that can be executed to perform method in accordance with the disclosed and claimed concept as well as other routines 64 that are utilized by the handheld electronic device 2. Additionally, the memory 12 can also store a variety of databases such as, without limitation, a language database.

As stated elsewhere herein, the apostrophe and the comma are both assigned to a single key 18. When a user actuates the key 18 to which the comma and apostrophe are assigned, the handheld electronic device 2 will prefer, in most circumstances, the comma over the apostrophe. To illustrate, if a user actuates the key 18 on which the comma and the apostrophe are assigned after actuating the key 18 on which the letters "E" and "R" are disposed, the handheld electronic device 2 will display the following outputs in the following sequence: the letter "E" followed by a comma (E,) (which is the preferred output 54), the letter "E" followed by an apostrophe (E'), the letter "R" followed by a comma (R,), and the letter "R" followed by an apostrophe (R'). The user, in order to output_the apostrophe, will have to highlight the apostrophe by moving the selection box 50, which would be an additional input.

There are instances, however, when the handheld electronic device 2 should prefer the apostrophe over the comma. For example, contractions are often used in the French language. There are, therefore, certain circumstances in the French language when the apostrophe, rather than the comma, can be the preferred punctuation to follow a single consonant at the beginning of the word.

According to an aspect of the present concept, the handheld electronic device 2 includes a routine 64, stored in memory 12 and executable by processor 10, for preferring one punctuation over another when both punctuations are programmed to a single key 18. This routine 64 may be used, for example, to prefer the apostrophe over the comma when one or more predetermined criteria are satisfied. A flowchart depicting one embodiment of the routine is depicted in FIG. 3.

As can be understood from FIG. 3, the routine begins at step 100, where the handheld electronic device 2 detects as an input an actuation of an input member.

Once the input has been detected by the handheld electronic device 2, the handheld electronic device 2 generates, as at 102, a first output based on the detected input.

After the handheld electronic device 2 has generated, at 102, the first output, the handheld electronic device 2 then detects, as at 104, as another input an actuation of an input member having a plurality of selectable output alternatives comprising a primary punctuation and a secondary punctuation. For example, the primary punctuation can be a comma while the secondary punctuation can be the apostrophe.

Once the handheld electronic device detects, at 104, the actuation of the input member having a plurality of selectable output alternatives, the handheld electronic device 2 determines, as at 106, whether the first output has a predetermined characteristic. For instance, the handheld electronic device 2 can be programmed to determine whether the first output is a single consonant at the beginning of a new word or phrase. Furthermore, the handheld electronic device 2 can be programmed to determine whether the first output is a consonant selected from a predetermined group comprising the letters "J", "T", "M", "N", "C", "L", and "S". In the present exemplary embodiment, a first output will have the predetermined characteristic if it meets both of these requirements.

If the handheld electronic device 2 does determine, at 106, that the first output has the predetermined characteristic, then the handheld electronic device prefers, as at 108, as the second output the secondary punctuation over the primary punctuation. If the handheld electronic device 2 determines, as at 106, that the first output does not have the predetermine characteristic (e.g. first output is not a consonant or is a consonant not in the predetermined group), then the handheld electronic device 2 will prefer, as at 110, as the second output the primary punctuation over the secondary punctuation.

The handheld electronic device 2 then outputs, as at 112, the second output.

To illustrate, if a user would like to enter "L'arbre" into the handheld electronic device 2 the user will first actuate the key 18 on which the letter "L" is disposed. The handheld electronic device 2 will then output the letter "L". When the user actuates the <SHIFT> key 18 followed by the key 18 to which the comma and apostrophe are assigned, the handheld electronic device 2 will prefer the apostrophe over the comma as the preferred output 54. The user will then enter the remaining letters to complete "L'arbre".

The method depicted in FIG. 3 and described herein would be useful, for instance, where French is the language of the handheld electronic device 2. As will be set forth in greater detail below, French can also be selected as the default input language from amongst a plurality of languages. Other examples employing other punctuations in accordance with different linguistic rules can be envisioned.

Figure 4:
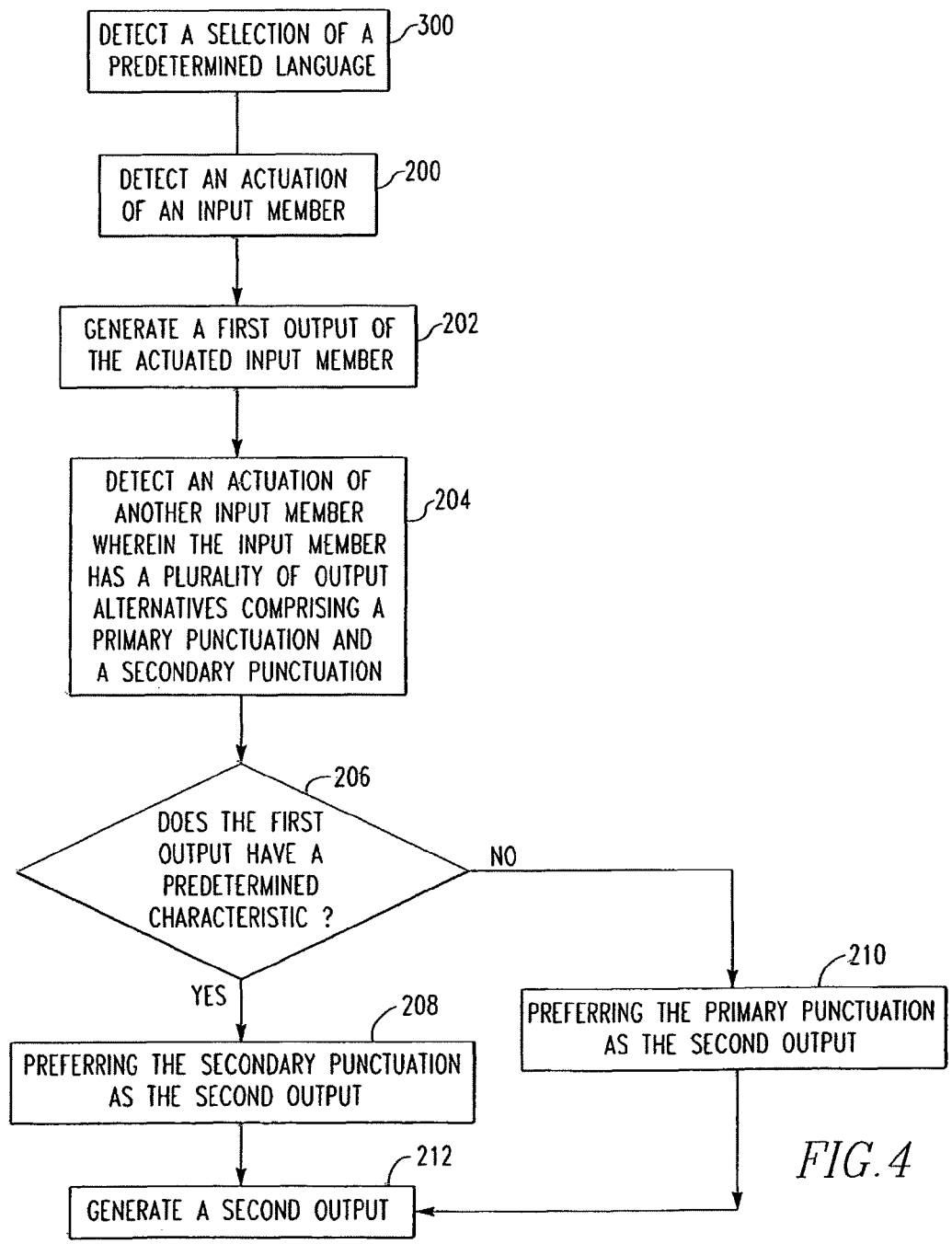
FIG. 4 is a flowchart depicting another embodiment of a method in accordance with the disclosed and claimed concept.

FIG. 4 depicts the general operation of another embodiment of an improved method in accordance with the disclosed and claimed concept.

In this particular embodiment, steps 200, 202, 204, 206, 208, 210, and 212 of FIG. 4 correspond to steps 100, 102, 104, 106, 108, 110, and 112 of FIG. 3 respectively. Therefore, the description of steps 100, 102, 104, 106, 108, 110, and 112 in the preceding paragraphs will also apply to their counterparts in FIG. 4.

Unlike the embodiment that is depicted in FIG. 3, however, this embodiment includes the step of detecting, as at 300, a selection of a predetermined language at anytime prior to preferring either the primary or secondary punctuation as the second output.

The handheld electronic device 2 prefers, as at 208, the secondary punctuation only if the handheld electronic device 2 detects, at 300, a predetermined language and determines, at 206, that the first output has a predetermined characteristic. For example, if the handheld electronic device 2 has a plurality of selectable languages available thereon, and if French is programmed into the handheld electronic device 2 as the predetermined language, then the handheld electronic device 2 will only prefer the secondary punctuation as the second output if the handheld electronic device detects 2 that French has been selected and that the first output has a predetermined characteristic (e.g. first output is a single consonant at the beginning of a new word and is among the predetermined group of consonants). Otherwise, the primary punctuation is preferred, as at 210, as the second output.

The handheld electronic device 2 then outputs, as at 212, the second output.

It is noted that the disclosed and claimed concept can also be used with other languages that may have accents including, but not limited to, the Romanic languages such as German, Spanish, Italian, and Portuguese as well as the Cyrillic languages such as Greek and Russian.

While specific embodiments of the disclosed and claimed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed and claimed concept which is to be given the full breadth of the claims appended and any and all equivalents thereof.

What is claimed is:

1. A method of enabling input on a handheld electronic device, said handheld electronic device including an input apparatus having a number of input keys that are capable of being selected, wherein at least one of said input keys has a plurality of selectable output alternatives, the method comprising:
   detecting a first input;
   responsive to said detecting said first input, generating a first output;
   detecting as a second input a selection of an input key having a plurality of output alternatives comprising at least a primary punctuation and a secondary punctuation;
   determining said first input has a predetermined characteristic;
   determining a preference for said secondary punctuation as a second output based on the determination that said first input has said predetermined characteristic; and
   outputting said second output.

2. The method of claim 1 wherein: said primary punctuation is a comma; and said secondary punctuation is an apostrophe.

3. The method of claim 2 wherein said predetermined characteristic includes said first input being a consonant.

4. The method of claim 3 further comprising determining that said consonant is a consonant from among a predetermined group of consonants.

5. The method of claim 3 further comprising determining that said consonant is a consonant from among a predetermined group of consonants comprising the letters j, t, m, n, c, l, and s.

6. The method of claim 2 wherein said predetermined characteristic includes said first input being the first character in a word.

7. The method of claim 1 further comprising detecting a selection of a predetermined language.

8. The method of claim 7 further comprising detecting as said predetermined language the French language.

9. A method of enabling input on a handheld electronic device, said handheld electronic device including an input apparatus having a number of input keys that are capable of being selected wherein at least one of said input keys has a plurality of selectable input alternatives, the method comprising:
   detecting a selection of a predetermined language;
   detecting a first input;
   responsive to said detecting said first input, generating a first output;
   detecting as a second input a selection of an input key having a plurality of output alternatives comprising at least a first punctuation and a second punctuation;
   determining said first input has a predetermined characteristic;
   determining a preference for said second punctuation as a second output based on the determination that said first input has said predetermined characteristic; and
   outputting said second output.

10. The method of claim 9 wherein:
said first punctuation is a comma; and
said second punctuation is an apostrophe.

11. The method of claim 10 wherein said predetermined characteristic includes said first input being a consonant.

12. The method of claim 11 further comprising determining that said consonant is a consonant from among a predetermined group of consonants.

13. The method of claim 11 further comprising determining that said consonant is a consonant from among a predetermined group of consonants comprising the letters j, t, m, n, c, l, and s.

14. The method of claim 11 wherein said predetermined characteristic includes said first input being the first character in a word.

15. The method of claim 9 further comprising detecting as said predetermined language the French language.

16. A handheld electronic device comprising:
an input apparatus having a number of input keys that are capable of being selected wherein at least one of said input keys has a plurality of selectable input alternatives;
a processor apparatus comprising a processor and a memory in electronic communication with said processor, said memory storing one or more routines executable by said processor, said processor apparatus being structured to:
detect a first input;
responsive to said first input, generate a first output;
detect as a second input a selection of an input key having a plurality of output alternatives comprising at least a primary punctuation and a secondary punctuation;
determine said first input has a predetermined characteristic;
determine a preference for said secondary punctuation as a second output based on the determination that said first input has said predetermined characteristic; and
output said second output.

17. The handheld electronic device of claim 16 wherein said primary punctuation is a comma and said secondary punctuation is an apostrophe.

18. The handheld electronic device of claim 17 wherein said first output is a consonant.

19. The handheld electronic device of claim 18 wherein said consonant is a consonant from among a predetermined group of consonants.

20. The handheld electronic device of claim 18 wherein said consonant is a consonant from among a predetermined group of consonants comprising the letters j, t, m, n, c, l, and s.

21. The handheld electronic device of claim 16 wherein said processor apparatus is structured to output as a variant said first output and said primary punctuation.

22. The handheld electronic device of claim 16 wherein said processor apparatus is structured to detect a selection of a predetermined language and, responsive thereto, to initiate the making of said determination.

23. The handheld electronic device of claim 22 wherein said processor apparatus is structured to detect as said predetermined language the French language.

* * * * *